2,989,440
Patented June 20, 1961

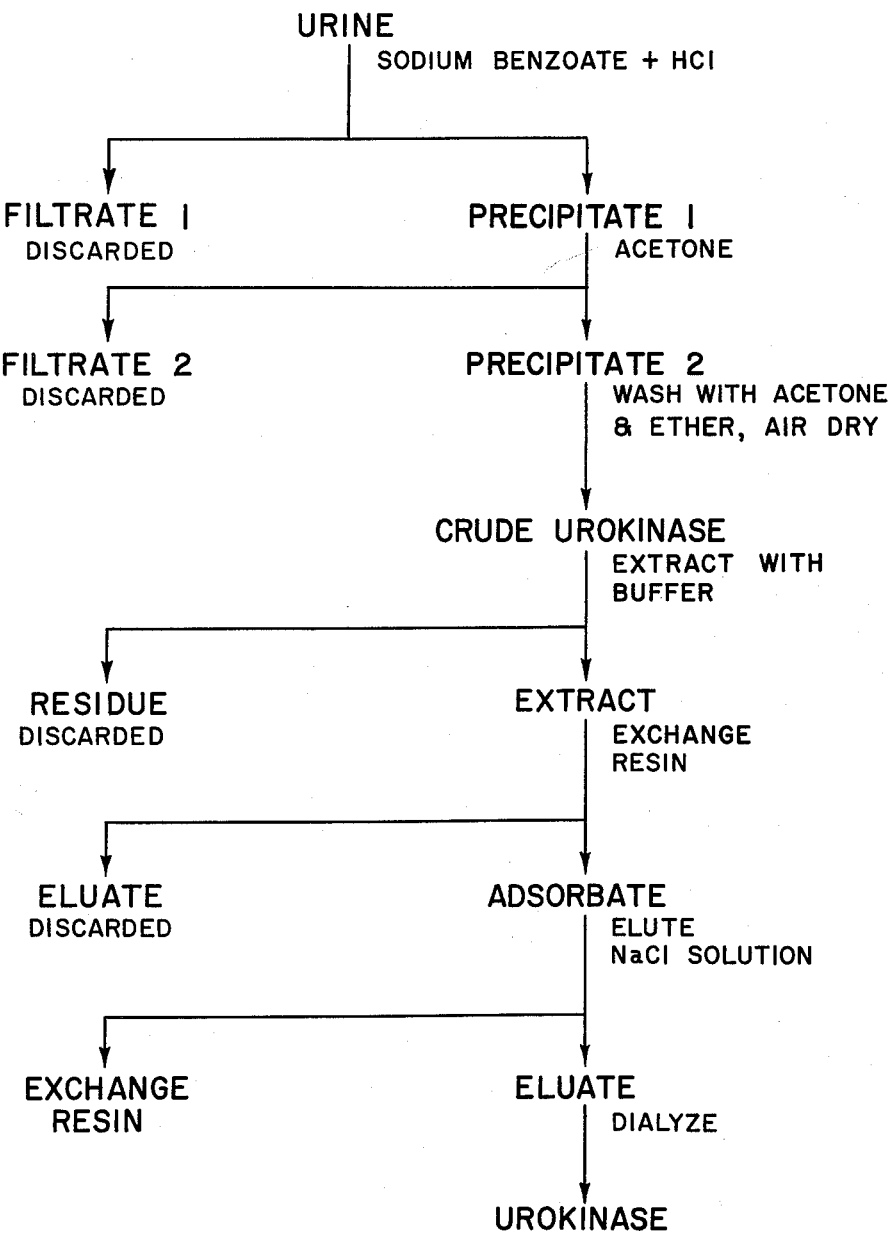

2,989,440
UROKINASE—A PLASMINOGEN ACTIVATOR AND METHODS OF OBTAINING THE SAME

Heron O. Singher, Plainfield, and Leo Zuckerman, Bound Brook, N.J., assignors to Ortho Pharmaceutical Corporation, a corporation of New Jersey
Filed Jan. 23, 1959, Ser. No. 788,652
1 Claim. (Cl. 195—66)

This invention relates to new and useful purified urokinase and urokinase products that are derived from mammalian urine and to methods for obtaining the same. More particularly, the invention relates to the production of new urokinase and urokinase products which are essentially free of inhibitors and other undesired products present in or derived from urine.

It is known that a factor called profibrinolysin exists in blood or blood serum or plasma which is capable, in the presence of another factor produced during growth of hemolytic streptococci, of dissolving fibrin. The inactive profibrinolysin is apparently an inactive enzyme (proenzyme), which is activated by the presenec of the activator or cofactor to form a fibrinolytic product called fibrinolysin, which is capable of dissolving blood clots or fibrin.

It is also known that instead of using bacterial filtrates such as staphylokinase or streptokinase, the inactive profibrinolysin can be activated by treatment with tissue extracts—fibrinolysokinase—and various organic solvents and compounds to give a fibrinolytic product which attacks the coagulation proteins. The presence in urine of an activator of both human and animal profibrinolysin (urokinase) has been demonstrated by several investigators, but separation of the profibrinolysin activator from inhibitors that are also present in the urine presented difficulties.

Urokinase has been purified by adsorption on silicic acid and elution with 4 percent ammonia. Further purification has been achieved by adsorption on a carboxylic acid cation exchanger equilibrated at pH 6.2. It has been observed that if urine is subjected to a simple shaking procedure, urokinase is concentrated in the foam. By separating this foam, an average recovery of over 70 percent of the urokinase is obtained. This amounts to a 19-fold increase in concentration. The separation of the profibrinolysin activator urokinase from inhibitors that are also present in urine remained a problem. One reason for this is that urokinase is easily destroyed by heat.

It is an object of the present invention to provide new and improved urokinase and urokinase products which are highly active and essentially free of inhibitors. A further object is to provide methods whereby new and improved products can be obtained by simple and direct procedures.

The above-mentioned and other objects of the invention are realized by precipitating urokinase from urine with benzoic acid. Preferably, the benzoic acid is formed in situ. Urokinase is then precipitated by an organic solvent which simultaneously dissolves the benzoic acid. The precipitate is washed with the organic solvent to remove chromogenic impurities and residual benzoic acid. The urokinase can be further purified by treatment with a carboxylic acid ion exchange resin, dialyzed and lyophilized.

It is an advantage of the procedure of the present invention that the sodium benzoate can be added to the urine as it is collected and act as a perservative.

The flow diagram illustrates one method of obtaining urokinase from urine according to the present invention. The entire procedure can be carried out at room temperature or about 5° C. Higher yields of active material are obtained at low temperatures using solvents cooled below 0° C.

Referring now to the flow diagram, sodium benzoate 5% to 1% weight by volume is dissolved in urine. An inorganic acid such as hydrochloric acid is added to a pH of about 3 to 5. At this pH, the organic acid is precipitated. The benzoic acid adsorbent may be used directly instead of the water soluble salt, but has less adsorptive surface or activity due to the larger particle size than that which is formed from solution.

The benzoic acid precipitate with the adsorbed urokinase is separated by filtration and mixed with a water-miscible organic solvent for benzoic acid such as ethanol, methanol or acetone, in sufficient quantity to dissolve the benzoic acid and precipitate the urokinase. A small amount of electrolyte, e.g., sodium benzoate or sodium chloride, may be added to a concentration of 0.1% to 0.5% to help the precipitate to flocculate out of solution. The precipitate is separated by centrifugation or filtration, washed with the organic solvent and then air dried. The yield is about 115 milligrams of crude urokinase per liter of urine. The activity is about 100 units per milligram tyrosine.

For further purification, the urokinase is treated with a carboxylic acid type cation exchange resin such as Amberlite XE–64 resin. Amberlite XE–64 is a fine particle size grade of Amberlite IRC–50, a weakly acidic carboxylic acid type cation resin, which is manufactured by Rohm and Haas Company to F.D.A. heavy metals specifications. The crude urokinase power is dissolved in 0.1 M phosphate-saline buffer at pH 6.2 in sufficient quantity to make about a 3% solution. This buffer is prepared by dissolving 5.4 grams $Na_2HPO_4 \cdot 2H_2O$, 8.5 grams $NaH_2PO_4$, and 5.8 grams sodium chloride in water to 1 liter volume. The buffer solution may have a pH range of 5 to 7.5 and the cation concentration may be about 0.1 N to 0.5 N. The urokinase solution is passed through an Amberlite XE–64 column which has been equilibrated with the same buffer. The column is then washed with about four hold-up volumes of buffer solution. Chromogenic and protein impurities are thus removed. To elute the urokinase, about four hold-up volumes of sodium chloride solution are passed through the resin exchange column. The sodium chloride solution used for elution may contain from about 0.4 gram mole to 1 gram mole of sodium chloride per liter. The eluates are collected in fractions, dialyzed and assayed. The active fractions are pooled and lyophilized.

The yield of purified urokinase from 10 grams of crude, or from 100 liters of urine, is about 1 gram.

The purified urokinase has an activity of about 160 units per milligram of powder, or about 100 units per milligram of tyrosine.

The following example is illustrative of the process of the present invention but is not to be construed as limiting.

Example I

In 20 liters of human urine is dissolved 1200 grams of sodium benzoate (6% weight by volume). The solution is acidified with aqueous hydrochloric acid (assay about 7.5% HCl) to a pH of 4.5 resulting in a heavy precipitation. This requires 10% of the original urine volume, or about 2 liters of aqueous hydrochloric acid. The suspension is stirred 20 minutes and is then allowed to stand for about 30 minutes. The mixture so obtained is filtered on a Buchner funnel that has been prepared with a precoat of benzoic acid crystals over filter paper. The filter cake is washed with a saturated benzoic acid solution, then sucked dry. The benzoic acid cake with the adsorbed urokinase weighs 2,060 grams.

The filter cake is stirred with 3.1 liters of acetone. The volume of acetone used is about 1.5 times the weight of the cake resulting in about a 65% acetone concentration. The benzoic acid dissolves in the acetone and the urokinase flocculates out. Sodium benzoate, about 1% of the weight of the cake, or 21 grams, is added to speed up the formation of the precipitate. The suspension of crude urokinase in acetone is filtered on a Buchner funnel using filter paper precoated with a diatomaceous silica product (Celite 505). The precipitate is washed with acetone until the filtrate is water clear. The precipitate is then washed with ether and air dried. The yield of powder so obtained is 2.3 grams.

Four batches of urokinase, obtained in this manner from 202 liters of urine, is pooled, amounting to 23.5 grams. The combined urokinase is suspended in 750 milliliters of 0.1 M phosphate-saline buffer at pH 6.2, stirred to dissolve the urokinase and centrifuged to remove the Celite. The residue is extracted two more times with 500 milliliter portions of 0.1 M phosphate-saline buffer. The combined extracts are filtered and labelled Extract 1. The residue is extracted three more times with 600 milliliter portions of buffer, the combined extracts are filtered and labelled Extract 2.

The clarified solution of the first phosphate-saline buffer extract, 1320 milliliters, is passed through 110 centimeters of Amberlite XE-64 ion exchange resin contained in a column 10 centimeters in diameter. The resin exchange column has a hold-up volume of about 2.8 liters. The second extract (Extract 2) of the Celite residue, 1720 milliliters, is then passed through the same exchange column. The column is washed with 11.4 liters of the phosphate-saline buffer. Then the adsorbate is eluted with 9 liters of 0.5 M sodium chloride. The eluate is dialyzed through a viscose regenerated cellulose membrane against distilled water. The active fractions within the dialysis sacs, totaling 4,940 milliliters, are pooled and lyophilized. The yield is 2.5 grams having an activity of 415,000 units or 166 units per milligram.

In comparing the activity of urokinase to streptokinase, it is found that it requires 0.01 milligram of urokinase to react with 0.4 milligram profibrinolysin to give a product of 12 units activity; while it requires 0.07 milligram of streptokinase to react with 0.1 milligram profibrinolysin to have the same activity.

Fibrinolysin made by reacting profibrinolysin with urokinase has an activity of 25 units per milligram. This fibrinolytic enzyme contained material only from human sources.

In determining the activity of the urokinase prepared by the present process, a BAME assay is run on the crude urokinase, using as substrate 0.001 M BAME or benzoyl-1-arginine methyl ester in 0.05 M tris (hydroxymethyl) aminomethane buffer at pH 8. Optical densities are read on a blank and a test solution at 254 M$\mu$ in a Beckman DU spectrophotometer at 25° C. The unit of activity, 1 BAME unit, is defined as the increase in optical density of 0.001 per minute.

The blank solution is prepared by mixing 3 milliliters of BAME with 0.5 milliliter of tris (hydroxymethyl) aminomethane buffer. The test solution is prepared by combining 0.5 milliliter of a mixture of urokinase and profibrinolysin, incubated at 37° C., for 10 minutes, with 3 milliliters of BAME. Designating the moment that the mixture is added to the BAME as "zero time," periodic readings are taken against the blank, beginning 5 minutes after zero time and continuing until 20 minutes after zero time. The increase in optical density per minute is uniform within this time range.

What is claimed is:

A method for obtaining urokinase which comprises treating mammalian urine at a pH of about 3 to 5 with benzoic acid, separating the benzoic acid from the urine, adding a water miscible organic solvent to the benzoic acid fraction to dissolve the benzoic acid and precipitate urokinase, adsorbing the urokinase on a carboxylic acid exchange resin, eluting the adsorbed urokinase, dialyzing the eluate and separating urokinase from the dialysate.

References Cited in the file of this patent

UNITED STATES PATENTS 2,385,443     Hoffmann             Sept. 25, 1945

OTHER REFERENCES

The Journal of Biological Chemistry, vol. 200, pp. 493–506 (1953), Waverly Press, Baltimore, Md.

Archives of Biochemistry and Biophysics, vol. 63, pp. 500–01 (1956), Academic Press, Baltimore, Md.